March 8, 1966   E. H. OLSON ETAL   3,239,598
POLYVINYL ACETAL RESIN TOGETHER WITH AN EPOXY RESIN AND A RESIN
SELECTED FROM UREA FORMALDEHYDE, MELAMINE, AND PHENOL
FORMALDEHYDE COATED ON AN INSULATED WIRE AND
METHOD FOR PRODUCING THE SAME
Filed April 4, 1961

INVENTORS
EMIL H. OLSON
IVAN W. WADE, Jr.
BY  Victor F. Volk

THEIR AGENT

United States Patent Office 3,239,598
Patented Mar. 8, 1966

---

3,239,598
POLYVINYL ACETAL RESIN TOGETHER WITH AN EPOXY RESIN AND A RESIN SELECTED FROM UREA FORMALDEHYDE, MELAMINE, AND PHENOL FORMALDEHYDE COATED ON AN INSULATED WIRE AND METHOD FOR PRODUCING THE SAME
Emil H. Olson, North Muskegon, and Ivan W. Wade, Jr., Muskegon, Mich., assignors, by mesne assignments, to Anaconda Wire and Cable Company, a corporation of Delaware
Filed Apr. 4, 1961, Ser. No. 100,550
20 Claims. (Cl. 174—120)

Our invention relates to a composition for cementing the wire of an electrical winding. More particularly our invention relates to such a composition comprising a blend of polyvinyl acetal and epoxy resins, to magnet wire coated with our composition, to windings formed therefrom and to the methods for forming such windings and for encapsulating the same.

In the manufacture of electrical windings and coils from a plurality of turns of magnet wire it is desirable to lock the turns into a rigid coil structure in which vibration will not be able to cause abrasion of the turns against each other with eventual breakdown of the intervening insulation coatings. Formation of rigid coil structures is also desirable from the viewpoint of apparatus assembly since it is much easier to assemble a rigid, shaped structure than a coil formed from loose and unmanageable turns of wire. It is known to form a coil into a rigid structure by means of a hardenable varnish which is applied to the turns, as by dipping, after the coil has been formed, and to encapsulate the windings of an apparatus by filling a container surrounding such winding with an appropriate resin. But the process of rigidizing coils by encapsulation has an objectionable feature and one that has never been solved entirely satisfactorily for coils of fine wire. This is the difficulty of penetrating into the inner turns of a thick coil with a viscous encapsulating resin. Where the encapsulating resin is a varnish thinned down with solvent to reduce its viscosity encapsulation has been unsatisfactory because the solvent becomes trapped in the innermost turns and cannot be readily removed by vaporization. There has also been a problem of retraining the shape of a coil during the encapsulating process, partiularly where this involves dipping the coil in a varnish bath and subsequently drying in it an oven. Many coil shapes are of a complex form that cannot be simply bound into shape by ties for the dipping operation, and even where this is possible it involves an additional operation and an increase in cost.

In order to overcome these problems there has been marketed for some time a cement-coated magnet wire on which a thin coating of a thermoplastic material such as polyvinyl butyral is applied. After this wire has been formed into a coil it is heated, causing the thermoplastic to flow and coalesce. When the coil has again cooled the fused coating serves to hold the coil in shape. But these known cement-coated magnet wires have the serious deficiency that coils formed from them must be larger than uncemented coils because of the wall of cement on each wire. At the same time, because it flows during the heat-setting of the coil, the wall of cement does not contribute to the dielectric strength of the insulation. An additional deficiency of known thermoplastic cements is that they will soften and permit the coil to disintegrate any time it is reheated either by overload currents or during a subsequent potting operation. It is true, also, that known types of magnet wire cement do not match the temperature performance of the newer magnet wire enamels, such as enamels based on epoxy resins.

We have invented a new adhesive composition particularly suitable for use as a magnet wire cement comprising a blend of a polyvinyl acetal and an epoxy resin. Our composition may advantageously comprise 100 parts by weight of polyvinyl acetal, 0.1-10 parts by weight of a resinous material such as urea formaldehyde, melamine, or phenol formaldehyde and 5-1,000 parts by weight of an epoxy resin of which the resin which is the reaction product of bisphenol A and epichlorohydrin is a preferred example and particularly such an epoxy resin having a weight per epoxide greater than 4,000. We particularly prefer to use urea formaldehyde as a resinous material in our composition and among the polyvinal acetals we prefer polyvinyl formal. We have found it particularly advantageous to further limit the ranges of the above mentioned components, all based on 100 parts by weight of the polyvinyl acetal, to 1-3 parts by weight of the urea formaldehyde, and 8-25 parts by weight of epoxy. To form a fluid coating composition we dissolve the components in a solvent comprising at least 20% cresylic acid to make up a 10-35% or, preferably, a 16-25% solids solution. We have further invented an insulated wire coated with our composition and an electrical winding in which a plurality of turns of coated wire are bonded together by fusion without sacrificing dielectric strength between turns from the strength of the same wires twisted together in the unfused state, said winding preferably being formed of the coated wire of our invention.

We have invented a method of forming an electrical winding in which the turns are firmly bonded together without the addition of encapsulating compound. In our method an electrical conductor is coated with an insulation having as an outer surface as resin such as a blend of polyvinyl acetal and an epoxy resin. This insulation is continuously baked to form a tack-free, flexible coating on the conductor which is then wound into a coil with a plurality of adjoining turns. The coil is then baked at a temperature above 100° C. and preferably 120–200° C. or the coating surface is wetted with a solvent which has a limited solvent effect such as methyl Cellosolve to bond the turns together. We can encapsulate the aforesaid coil by heating it, as by resistance heating the conductor, above the fusion temperature of a suitable encapsulating powder and bringing it in contact with such a powder.

A more complete understanding of our invention can be gained from the drawing.

Figure 1:
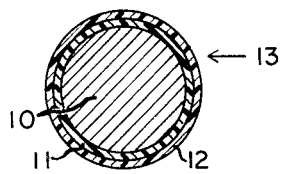
FIG. 1 is a section of a conductor made in accordance with our invention.

Referring to FIG. 1 a wire 10 of copper or aluminum but not limited thereto is coated with a dielectric film of magnet wire enamel 11. The enamel 11 is a known type of epoxy enamel but our invention is not limited thereto and the enamel 11 may comprise other known materials including polyvinyl formal (Formvar), oleoresin, polyurethane, polyester and nylon. In some embodiments of our invention the enamel 11 is omitted entirely as will be hereinafter described. Over the enamel 11 there is applied a coating 12 of an adhesive composition which constitutes an important feature of our invention. The complete magnet wire is indicated generally as 13.

Figure 2:
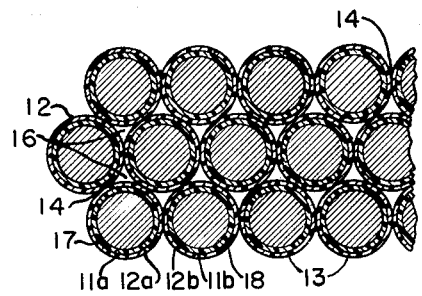
FIG. 2 is a partial section of a coil made in accordance with our invention.

The coating 12 has high dielectric strength in its own right which may approximate or exceed, on a volt-per-mil basis, the dielectric strength of the enamel 11, but it has the additional property of bond ability which can be realized by the application of heat or by wetting with an appropriate solvent. It is a feature of the coating 12, however, that although it can be made to bond to adjacent coatings of the same composition or to other surfaces such as paper interlayers, it does not flow in the course of bonding but retains its dielectric integrity and changes very little, if at all, in thickness. This property is shown more clearly in FIG. 2 which is a fragment of a section of a coil where a number of turns of the magnet wire 13 have been bonded together. At areas of contact 14 between adjacent turns of the magnet wire 13 the coating 12 has formed a cohesive bond but there is no reduction of the thickness of the coatings 12 at areas of contact 14 and no flowing of the coating 12 into interstices 16. Considering two adjacent turns 17, 18, the dielectric strength between these turns will equal the sum of the strengths of the insulating film 11a, the coating 12a, the coating 12b and the insulating film 11b. This is a very important consideration and constitutes one of the principal merits of our invention because compactness is a prime consideration in the design of modern electromagnetic equipment and the size of a coil such as that partly shown in FIG. 2 is almost always held to the absolute minimum. This means that the dielectric coating on the conductors should be no thicker than necessary to withstand the voltage and service conditions the apparatus will be required to meet. In known types of cement coatings the size of the coils always has to be increased over that dictated by dielectric strength requirements in order to provide for the cement which, because it flows during the bonding operation, makes little or no contribution as an insulation between turns. In coils made according to our invention the dielectric strength between turns can first be calculated and the required insulation thickness made up of the insulating layer 11 and bonding layer 12 without fear that the layer 12 will lose dielectric strength in the bonding operation.

Although we have shown the conductor 10 as a round wire it should be understood that our coatings can be applied to the other shapes and materials and particularly to flat foils such as aluminum foils and to tapes such as paper tapes and particularly where such tapes are used as layer or phase insulation in electrical windings. It should also be noted that since the coating 12 of our invention has high dielectric strength it may be used as the sole coating over the conductor 10, and wire covered only with our coating 12 can be wound into coils and bonded to form rigid coil structures without loss of dielectric strength.

We have found that a coating 12 compounded of a blend comprising polyvinyl acetal and epoxy resins serves admirably as a bonding agent. In order to have a resin with long storage life and one that will not cure prematurely we prefer to employ an epoxy system that cures by means of a coupling process with a coreacting resin. The epoxy resins we prefer to use in our formulation are solids and the coreacting resins are blended with them while both are dissolved in a solvent such as cresylic acid. Urea formaldehyde, phenol formaldehyde and melamine may be used as the coreacting resin for curing our compound but we have found urea formaldehyde to be most satisfactory and to produce a superior coating.

The term, polyvinyl acetal is widely used in a generic sense for any of a number of resins produced by the reaction of an aldehyde with a polyvinyl ester such as polyvinyl acetate. Polyvinyl alcohol is an intermediate product of this reaction and it continues to react further with the aldehyde in the formation of a resin. When the aldehyde used is acetaldehyde the resulting resin is a true polyvinyl acetal. Similarly, polyvinyl butyral can be formed by reacting polyvinyl alcohol with butyl aldehyde and polyvinyl formal by a reaction with formaldehyde. We have found that the higher melting polyvinyl formal resins are to be preferred in the formulation of compound made in accordance with our invention. These resins are commercial products and the resin sold by the Shawinigan Resins Corp. under the trade name of Formvar has been found eminently satisfactory for the polyvinyl acetal component in our invention.

Epoxy resins are well known in commerce and are formed by the reaction of epichlorohydrin with polyhydric materials. The particular epoxy resin which we have found to be most satisfactory in the compound of our invention is the reaction product of epichlorohydrin with p,p'-isopropylidenediphenol, known commercially as bisphenol A. We have used the products sold by Jones-Dabney Co. division of Devoe & Reynolds Co., Inc. under the trade names Epi-Rez 530, Epi-Rez 540, Epi-Rez 550 and Epi-Rez 560 which are all hard bisphenol A epoxy resins in the formulation of our invention. Particularly we have found that Epi-Rez 560 which has a melting point of 166° C. and a weight per epoxide of 4,641 produces in the compound of our invention a high-temperature softening product of particular application in modern apparatus designed for high operating temperatures. In such applications we prefer an epoxy resin with a weight per epoxide over 4,000. We have also found it advantageous to blend the solid epoxy resins with from 5–50% (based on total epoxy resin content) of a liquid epoxy resin having a weight per epoxide of approximately 180–200 and have found that Epi-Rez 510 is a suitable liquid resin for this purpose.

The ratio of the components of the coating 12 are conveniently expressed on the basis of 100 parts by weight of the polyvinyl acetal component. The coating 12 comprises, to 100 parts of polyvinyl acetal, 0.1–10 parts of the coreacting resin (urea formaldehyde, melamine, phenol formaldehyde) and 5–1,000 parts by weight of epoxy resin. However, we have found that a superior product is produced when the parts per 100 parts by weight of polyvinyl acetal are limited to 1–3 parts by weight of the coreacting resin, and 8–25 parts by weight of epoxy. For application to wire our compound is dissolved in a solvent of which the active ingredient is cresylic acid. The cresylic acid should make up at least 20% by weight of the solvent with the remainder extenders such as naphtha hydrocarbons and ketones.

It is a particular advantage of the compound of our invention that it can be applied in conventional enamelling machines and, indeed, that it can be so applied in the course of normal enamelling operations. In an enamelling operation wherein it has been standard practice to apply six coats of enamel to a wire we now, for example, apply four coats of standard enamel and two outer coats of the bonding composition of our invention. A standard enamelling machine includes one or more ovens which evaporate the solvents from wire enamel and bake the enamel to a hard, dry, flexible finish. Our bonding compound emerges from such ovens thoroughly dry and free from tack, and superficially indistinguishable from an ordinary enamelled magnet wire. However, after our wire 13 has been formed into a coil it can be baked at a temperature in excess of 100° C. for a period of time such as one hour to form a rigid structure.

No additional varnish is needed to keep the bonded coil of our invention rigid but it may be desirable to protect the coil with a heavy coating of an encapsulating material. Where such a material is applied hot such as by hot dipping or by fusing a powder over the surface it has been necessary in prior art coils to bind the coils, as by tie wires or braces so that they will retain their shape during the hot dip and subsequent baking of the encapsulant. Known types of magnet wires cements have not eliminated the need for such tie wires or braces because, being themselves thermoplastic they lose their bonding strength at the encapsulating temperatures and release the turns of the coil.

Figure 3:
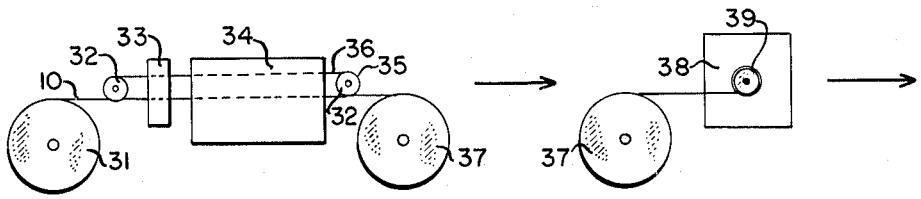
FIG. 3 is a diagrammatic representation of the steps of a method employed in our invention.
Figure 3:
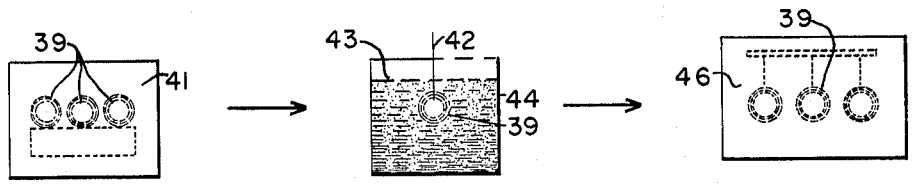

A method of forming bonded windings and encapsulated coils in accordance with our invention is shown schematically in FIG. 3. The conductor 10 is paid from a reel 31 or other package over one of a bank of sheaves 32, through an enamel applicator 33, and oven 34 and over another bank of sheaves 35. Where, as is almost universally the case, more than one coating is to be applied, the wire leaves the bank of sheaves at 36 and returns to the sheaves 32 from which it pases again through the applicator 33 and the oven 34. This may be repeated as many times as necessary according to the number of coatings that are required, but at least the outer coating should comprise the bonding composition of our invention, the other coatings being non-bonding enamel of a known type. We prefer to apply two coatings of bonding composition but we can also form the entire insulation wall from our compound by applying a single coating of the same each time the conductor passes through the applicator. After the conductor 10 has received its final coating and baking it is taken up on a reel 37. The temperatures vary within the oven 34 between about 150–350° C. when an epoxy enamel is applied under the bonding composition 12. Other temperatures may be required for other enamels but the speed of the wire must be adjusted so that the temperature will bake the bonding coat without over curing or softening the underlying enamel layers. The reel 37 is then moved to a coil winding machine 38 where it is wound into coils one of which is shown diagrammatically on the machine 38 at 39. The formed coils 39 are then baked in an oven 41 to bond the turns at a temperature above 100° C. and preferably 120–200° C. The higher the baking temperature within these limits the stronger the bond. It is an important advantage of our invention that although we prefer that the coil 39 should be firmly made so that each turn of coated conductor 13 (FIG. 2) has long uninterrupted lines of contact with adjacent turns, it is not necessary to exert presure on the coil in order to get good adhesion during the bonding operation. We have discovered that the turns will fuse together in an irreversible reaction in the course of which no gases are evolved and there is no appreciable shrinking of the films. A thorough bake will take place in an hour but the length of the bake is not highly critical and if the underlying enamel is a high performance enamel such as an epoxy enamel the coil can be stored or operated at temperatures not exceeding 200° C. without damage. Shorter baking times can also be used with the expectation that the ultimate bond strength will be reached in service due to the continued heat of operation of the apparatus. Although for many purposes a coil 39 is completed when it has cooled after leaving the oven 41, a further encapsulating opeartion may be applied within one embodiment of our method. Here the coil 39 is suspended by a string 42 and immersed in an encapsulating substance 43 in a container 44. The encapsulant 43 may be a molten varnish or enamel or it may be a dry powder such as an epoxy powder maintained by known methods in a fluid bed. Where the encapsulant 43 is a powder the coil 39 is heated. This may be done by immersing it in the encapsulant directly from the oven 41 before it has had a chance to cool, by reheating the baked coils in an oven, or by resistance heating of the conductor 10 during or immediately prior to the immersion. When the heated coil is immersed into the fluid bed the powder will adhere to the coil and fuse thereon. In prior art methods one or more additional steps have been required to keep the coils from falling apart during the encapsulation. This involves a typing or binding operation to fix the shape of the coil and not only adds to the cost but also increases the bulk of the coils since the tie wires are necessarily included under the encapsulating coating. For irregular coil shapes with compound curve surfaces no method of tying will suffice to hold the shape and our method is the only way that dip coatings of high-temperature encapsulants can be applied to such coils.

After the coils have been coated by a sufficient number of dips in the container 44 they are given a final bake in an oven 46.

EXAMPLE 1

In the practice of our invention 8.67 lb. SC–100, a high-flash aromatic naphtha with a boiling range 154–185° C., 0.127 lb. diacetone alcohol, and 0.226 lb. WES oil, a hydrocarbon solvent supplied by the Barret Division of Allied Chemical Corp. and having a boiling range of 165–220° C., were stirred in a kettle with 3.26 lb. Formvar polyvinyl formal resin until thoroughly wetted. Then 4.296 lb. cresylic acid and 0.326 lb. Epi-Rez 560 epoxy resin were added and the mixture stirred at 120–140° F. until all the solids were dissolved. The heat was removed and 0.06 lb. Beetle 227–8, a butylated urea-formaldehyde resin supplied by the American Cyanamid Co., was added with constant stirring. The contents of the kettle were then applied as the last two coats to an 18 AWG soft copper conductor in a horizontal enamelling machine, over four coats of standard epoxy enamel being applied in the same machine in the same operation and cured at 150–350° C. gradient in the oven of the enamelling machine. The oven was 18 feet long and the wire speed was 32 ft./min.. The wire compound was found to have a tack point of 110–122° C. The tack point is determined as the coolest temperature at which a small piece of aluminum foil can be "picked up" by adhering to the coating. A length of the wire was aged in an oven for 168 hrs. at 150° C. after which it was wrapped around a mandrel having a diameter three times the diameter of the wire, without any evidence of cracking of the coating.

EXAMPLE 2

An insulated conductor was prepared in a manner identical to Example 1 except that the amount of the Beetle 227–8 added was 0.34 lb. The wire was stretched to rupture without cracking the enamel. A length of the wire aged for 96 hrs. at 150° C. did not crack the coating when wrapped around a mandrel having the same diameter as the wire. A sample aged 168 hrs. at 150° C. did not crack the coating when wrapped around a mandrel having a diameter three times the diameter of the wire.

EXAMPLE 3

An insulated conductor was prepared in accordance with Example 1 except that the weight of Epi-Rez 560 added was 1.304 lb. and the urea formaldehyde was omitted. The copper was pulled to failure without cracking the coating. Two lengths of the insulated conductor were twisted together and 60 cycle potential of 7,600 volts was impressed between the conductors without rupturing the coatings. The coatings were found to have a tack point of 102–119° C. After heat aging for 96 hrs. in an oven at 150° C. the coating showed cracks when wrapped around a mandrel having a diameter five times the diameter of the wire.

Coated conductor made in accordance with Example 1 was precision wound on ½-inch diameter mandrels and after removal from the mandrels the coils were oven bonded for one hour at the temperatures given in Table I. The coils were then reheated for ten minutes at the temperatures shown in the first column of Table I and while still at that temperature the bond strengths were determined by measuring the force required to unwind the freely rotating coil and subtracting from it the force required to unwind an identical unbonded coil.

*Table I.—High temperature bond strengths of 18 AWG made per Example 1*

| Testing Temp. | Bond Strength—grams | | |
|---|---|---|---|
| | 130 C.[1] | 150 C.[1] | 190 C.[1] |
| 125 C | 400 | 415 | 565 |
| 150 C | 150 | 245 | 400 |
| 170 C | 110 | 218 | 190 |

[1] Bonding temp.

For comparison a conventional Formvar magnet wire coated with polyvinyl butyral cement was tested similarly, with the results shown in Table II.

*Table II.—High temperature bond strengths 18 AWG conventional cement-coated wire*

| Testing Temp. | Bond Strength—grams | | |
|---|---|---|---|
| | 130 C.[1] | 150 C.[1] | 190 C.[1] |
| 125 C | 395 | 400 | 510 |
| 150 C | 40 | 0 | 30 |
| 170 C | 0 | 0 | 0 |

[1] Bonding temp.

From Tables I and II it is obvious that the magnet wire of our invention and windings made therefrom will retain their shape during periods of overload or of overheating for any reason whereas the prior art windings lose the property of adhesion between turns when the temperature rises, even temporarily.

*Table III.—High temperature bond strength of rectangular magnet wire with novel bonding coat*

| | Bonding and Testing Temp., °C. | | |
|---|---|---|---|
| | 130 | 150 | 190 |
| Holding force, pounds | 81 | 44 | 10 |

Table III serves to point out an important advantage of our invention in that flat or rectangular conductors coated with our bonding compound over an insulating enamel or with our compound alone may be wound into a pancake coil and rigidly bonded in that form without any additional encapsulating agent or binding wires.

EXAMPLE 4

Wire was coated in accordance with Example 1 except that a rectangular conductor .130×.064 inch was used. Lengths of the coated wire were overlapped 1 inch and bonded for 1 hr. at the temperatures indicated in Table III. The force required to break the bond *at the bonding temperature* is shown in Table III.

The rectangular wire of Example 4 was aged under oil in sealed glass tubes. The tubes were then opened and the wire and oil were reheated to the test temperatures shown in Table IV. Samples were removed individually from the hot oil and tested within several seconds to obtain the bond strength values shown in the table.

*Table IV.—High temperature bond strength of novel rectangular magnet wire after aging in hot transformer oil*

| Aging Conditions | Testing Temp., C. | Bond Strength, lbs. | |
|---|---|---|---|
| | | 150 C.[1] | 190 C.[1] |
| Aged 2 wks. in oil at 150 C | 130 | 127 | 159 |
| | 150 | 58 | 75 |
| Aged 8 wks. in oil at 130 C | 130 | 119 | 174 |

[1] Bonding temp.

None of the wires of the bonded pairs tested in Table IV sliped or tilted with respect to each other during aging at 130° C. or 150° C. even though the test samples were all positioned vertically. These tests demonstrate that the bond strength of our bonding compound is fully retained in transformer oil.

We have invented new and useful compositions and articles incorporating the same and have invented new methods of making useful articles for which we desire letters patent.

We claim:

1. An insulated wire comprising a metallic conductor and a dry, tack-free coating over said conductor comprising 100 parts by weight of polyvinyl acetal, 0.1–10 parts by weight of a resinous material selected from the group consisting of urea formaldehyde, melamine, and phenol formaldehyde, and 5–1,000 parts by weight of an epoxy resin.

2. The wire of claim 1 wherein said polyvinyl acetal is polyvinyl formal.

3. The wire of claim 1 wherein said resinous material is urea formaldehyde.

4. The wire of claim 1 wherein said epoxy resin in a reaction product of bisphenol A and epichlorohydrin having a molecular weight per epoxide greater than 4,000.

5. An insulated wire comprising a metallic conductor, a coating of insulation over said conductor and a dry, tack-free coating over said insulation comprising 100 parts by weight of polyvinyl acetal, 0.1–10 parts by weight of a resinous material selected from the group consisting of urea formaldehyde, melamine, and phenol formaldehyde, and 5–1,000 parts by weight of an epoxy resin.

6. The wire of claim 5 wherein said polyvinyl acetal is polyvinyl formal.

7. The wire of claim 5 wherein said resinous material is urea formaldehyde.

8. The wire of claim 5 wherein said epoxy resin is the reaction product of bisphenol A and epichlorohydrin having a molecular weight per epoxide greater than 4,000.

9. The wire of claim 5 wherein said insulation is selected from the group consisting of epoxy, polyvinyl acetal, and silcone enamels.

10. An insulated wire comprising a metallic conductor, a coating of insulation over said conductor and a dry, tack-free coating over said insulation comprising 100 parts by weight of polyvinyl formal, 1–3 parts by weight of urea formaldehyde, and 8–25 parts by weight of an epoxy resin derived from bisphenol A and epichlorohydrin.

11. The wire of claim 10 wherein said epoxy resin has a weight per epoxide greater than 4,000.

12. The wire of claim 10 wherein said insulation is selected from the group consisting of epoxy enamel.

13. An electrical winding comprising a plurality of turns of wire bonded together by means of a resinous composition comprising 100 parts by weight of polyvinyl acetal, 0.1–10 parts by weight of a resinous material selected from the group consisting of urea formaldehyde, melamine, and phenol formaldehyde, and 5–1,000 parts by weight of an epoxy resin.

14. The winding of claim 13 wherein said polyvinyl acetal is polyvinyl formal.

15. The winding of claim 13 wherein said resinous material is urea formaldehyde.

16. The winding of claim 13 wherein said epoxy resin is the reaction product of bisphenol A and epichlorohydrin.

17. An electrical winding comprising a plurality of turns of wire bonded together by means of a resinous composition comprising 100 parts by weight of polyvinyl formal, 1–3 parts by weight of urea formaldehyde, and 8–25 parts by weight of an epoxy resin derived from bisphenol A and epichlorohydrin having a molecular weight per epoxide greater than 4,000.

18. The method of forming an electrical winding comprising a plurality of turns firmly bonded together without the addition of encapsulating compound comprising the steps of coating an electrical conductor with an insulation having as an outer surface a blend comprising 100 parts by weight of polyvinyl acetal, 0.1–10 parts by weight of a resinous material selected from the group consisting of urea formaldehyde, melamine, and phenol formaldehyde, and 5–1,000 parts by weight of an epoxy resin, continuously baking said insulation at 120–350° C. to form a tack-free, flexible coating on said conductor, winding said coated conductor into a coil having a plurality of adjoining turns, and baking said coil at a temperature of 120–200° C. thereby bonding together said turns without any appreciable flowing of said outer surface.

19. The method of forming an electrical winding comprising comprising a plurality of turns firmly bonded together without the addition of encapsulating compound comprising the steps of coating an electrical conductor with an insulation having as an outer surface a blend comprising 100 parts by weight of a polyvinyl acetal, 0.1–10 parts by weight of a resinous material selected from the group consisting of urea formaldehyde, melamine, and phenol formaldehyde, and an epoxy resin, continuously baking said insulation at 120–350° C. to form a tack-free flexible coating on said conductor, winding said coated conductor into a coil having a plurality of adjoining turns, wetting said surface with a fluid having a limited solvent effect thereon and drying said coil thereby bonding together said turns without any appreciable flowing of said surface.

20. The method of making an encapsulated electrical winding comprising the steps of coating an electrical conductor with an insulation having as an outer surface a blend comprising 100 parts by weight of a polyvinyl acetal, 0.1–10 parts by weight of a resinous material selected from the group consisting of urea formaldehyde, melamine, and phenol formaldehyde, and 5–1,000 parts by weight of an epoxy resin, continuously baking said insulation to form a flexible coating on said conductor, winding said coated conductor into a coil having a plurality of adjoining turns, baking said coil at a temperature sufficient to bond together said turns without any appreciable flowing of said outer surface, and bringing said coil into contact with an encapsulating powder while said coil is at a temperature above the fusion temperature of said powder.

References Cited by the Examiner

UNITED STATES PATENTS

| | | | |
|---|---|---|---|
| 2,531,169 | 11/1950 | Sprung | 174—110.45 |
| 2,697,640 | 12/1954 | Novak | 174—110 |
| 2,730,467 | 1/1956 | Daszewski | 117—232 |
| 2,802,897 | 8/1957 | Hurd et al. | 174—110 |
| 2,920,990 | 1/1960 | Been et al. | 260—831 |
| 2,941,981 | 6/1960 | Elbling et al. | 117—232 |
| 2,985,950 | 5/1961 | Duman | 29—155.57 |
| 2,986,546 | 5/1961 | Naps | 260—831 |
| 2,991,326 | 7/1961 | Ford et al. | 174—17 |
| 2,997,776 | 8/1961 | Matter et al. | 29—155.57 |
| 3,037,279 | 3/1962 | Kurka et al. | 117—232 |
| 3,038,831 | 6/1962 | Rosenberg | 117—232 X |
| 3,089,787 | 5/1963 | Satter et al. | 117—231 X |
| 3,093,511 | 6/1963 | Weisel et al. | 117—232 |
| 3,119,897 | 1/1964 | Coper | 117—218 X |

FOREIGN PATENTS 547,532   9/1942   Great Britain.

JOSEPH B. SPENCER, *Primary Examiner.*

BENNETT G. MILLER, JOHN P. WILDMAN, RICHARD D. NEVIUS, *Examiners.*